(12) United States Patent
Im

(10) Patent No.: US 10,382,745 B2
(45) Date of Patent: Aug. 13, 2019

(54) STEREOSCOPIC IMAGE DISPLAY DEVICE AND DRIVING METHOD THEREOF

(71) Applicant: LG Display Co., Ltd., Seoul (KR)

(72) Inventor: Hee-Jin Im, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 271 days.

(21) Appl. No.: 15/433,111

(22) Filed: Feb. 15, 2017

(65) Prior Publication Data

US 2017/0237972 A1 Aug. 17, 2017

(30) Foreign Application Priority Data

Feb. 15, 2016 (KR) ........................ 10-2016-0016936

(51) Int. Cl.
*H04N 13/305* (2018.01)
*G02B 27/22* (2018.01)
*H04N 13/317* (2018.01)

(52) U.S. Cl.
CPC ....... *H04N 13/305* (2018.05); *G02B 27/2214* (2013.01); *H04N 13/317* (2018.05)

(58) Field of Classification Search
CPC . H04N 13/305; H04N 13/317; G02B 27/2214
See application file for complete search history.

(56) References Cited

U.S. PATENT DOCUMENTS

| | | |
|---|---|---|
| 2008/0218433 A1 | 9/2008 | Hong et al. |
| 2009/0015738 A1 | 1/2009 | Hong et al. |
| 2010/0309296 A1* | 12/2010 | Harrold ............. G02B 27/2214 348/54 |
| 2011/0007390 A1 | 1/2011 | Yanamoto |
| 2011/0050683 A1 | 3/2011 | Yun et al. |
| 2011/0234929 A1 | 9/2011 | Lin |
| 2012/0327073 A1 | 12/2012 | Cha et al. |

(Continued)

FOREIGN PATENT DOCUMENTS

| | | |
|---|---|---|
| CN | 101344642 A | 1/2009 |
| CN | 101945297 A | 1/2011 |

(Continued)

OTHER PUBLICATIONS

First Notification of Office Action dated May 3, 2018, The State Intellectual Property Office of the Peoples Republic of China in counterpart Chinese application No. 201710078213.X. Note: JP2011-017788 cited therein are already of record.

(Continued)

*Primary Examiner* — Mishawn N. Hunter
(74) *Attorney, Agent, or Firm* — Morgan, Lewis & Bockius LLP

(57) ABSTRACT

A stereoscopic image display device including a display panel including a plurality of sub-pixels arranged in a matrix defined by a horizontal direction and a vertical direction, the display panel having a changeable display direction; and a parallax unit on the display panel and including a plurality of optical elements having a tilt angle of 30° to 60° relative to the vertical direction and a pitch corresponding to a multiple of a pitch of the sub-pixels. Among the sub-pixels located to correspond to each of the optical elements, at least two sub-pixels, adjacently arranged, display the same view image.

12 Claims, 12 Drawing Sheets

Viewing direction

(56) References Cited

U.S. PATENT DOCUMENTS

| | | | |
|---|---|---|---|
| 2014/0009463 A1* | 1/2014 | Watanabe | H04N 13/315 345/419 |
| 2014/0118226 A1* | 5/2014 | Gollier | G02B 27/2214 345/32 |
| 2014/0285643 A1 | 9/2014 | Usukura | |
| 2015/0179218 A1* | 6/2015 | Nadler | H04N 13/111 382/154 |
| 2015/0268479 A1* | 9/2015 | Woodgate | G02B 27/2214 349/15 |
| 2015/0362740 A1 | 12/2015 | Hamagishi et al. | |
| 2016/0191904 A1* | 6/2016 | An | H04N 13/349 384/51 |
| 2016/0269718 A1* | 9/2016 | Jin | G02B 27/2214 |

FOREIGN PATENT DOCUMENTS

| | | | | |
|---|---|---|---|---|
| CN | 102014289 A | 4/2011 | | |
| CN | 102843567 A | 12/2012 | | |
| CN | 104820293 A | 8/2015 | | |
| JP | 2011017788 A | 1/2011 | | |
| JP | 2011197676 A | 10/2011 | | |
| JP | 2015-004698 A | 1/2015 | | |
| KR | 10-2008-0082111 A | 9/2008 | | |
| KR | 20150002159 | * | 1/2015 | H04N 13/04 |
| TW | 201133032 A | 10/2011 | | |

OTHER PUBLICATIONS

Office Action dated Jan. 13, 2017 from the Korean Patent Office in counterpart Korean application No. 10-2016-0016936.

* cited by examiner

Viewing direction

Viewing direction

[Right eye image displayed region]

STEREOSCOPIC IMAGE DISPLAY DEVICE AND DRIVING METHOD THEREOF

This application claims the benefit of Korean Patent Application No. 10-2016-0016936, filed in Korea on Feb. 15, 2016, which is hereby incorporated by reference as if fully set forth herein.

BACKGROUND

Field of the Invention

The present invention relates to a stereoscopic image display device, and more particularly, to a stereoscopic image display device in which a display image is rotatable.

Discussion of the Related Art

Stereoscopic image display devices may be divided into a glasses type and a glasses-free type (i.e., an autostereoscopic type) according to whether glasses are needed. An autostereoscopic image display device displays a 3D image by installing optical elements, which may cause disparity between a left eye image and a right eye image, in front of a display screen. Such optical elements include lenticular lenses, a parallax barrier, etc.

The parallax barrier outputs a stereoscopic image by separating left and right images from each other through vertical slits arranged at designated intervals to transmit or block light. The lenticular lenses outputs a stereoscopic image by separating left and right images from each other by attaching a lenticular lens array to a display panel to cause left and right eyes to see different pixels.

In a general stereoscopic image display device, an intensity of 3D crosstalk is proportional to a tilt angle of optical elements. Therefore, the related art stereoscopic image display device sets the tilt angle of the optical elements relative to the y-axis direction to 0 to 10 degrees to reduce crosstalk. Accordingly, if the related art stereoscopic image display device rotates an image and then displays the image, the tilt angle of the optical elements relative to the y-axis direction corresponds to 80 to 90 degrees and strong 3D crosstalk occurs. Thus, it may be difficult to change an image display direction.

SUMMARY

Accordingly, the present invention is directed to a stereoscopic image display device and a driving method thereof that substantially obviate one or more problems due to limitations and disadvantages of the related art.

An object of the present invention is to provide a stereoscopic image display device that may change an image display direction while minimizing 3D crosstalk, and a driving method thereof.

Additional features and advantages of the invention will be set forth in the description that follows, and in part will be apparent from the description, or may be learned by practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device comprises a display panel including a plurality of sub-pixels arranged in a matrix defined by a horizontal direction and a vertical direction, the display panel having a changeable display direction; and a parallax unit on the display panel and including a plurality of optical elements having a tilt angle of 30° to 60° relative to the vertical direction and a pitch corresponding to a multiple of a pitch of the sub-pixels, wherein, among the sub-pixels located to correspond to each of the optical elements, at least two sub-pixels, adjacently arranged, display the same view image.

In another aspect, a driving method, of a stereoscopic image display device, having a display panel including a plurality of sub-pixels arranged in a matrix defined by a horizontal direction and a vertical direction to display images with the display panel having a changeable display direction, and a parallax unit on the display panel and including a plurality of optical elements having a tilt angle of 30° to 60° relative to the vertical direction and a pitch corresponding to a multiple of the pitch of the sub-pixels, comprises constructing an initial view map to cause the display panel to display r view images (r being a natural number of 3 or more); amending the initial view map to cause sub-pixels displaying the r view images to display k view images (k being a natural number of 2 or more, being less than r) by defining k regions formed by dividing the pitch of each optical element into k equal parts, causing sub-pixels corresponding to an $l^{th}$ region of the k regions (with 'l' being a natural number of 'k' or less) to display the same view image and causing sub-pixels corresponding to the different regions to display different view images; and displaying a plurality of views separated from the display image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION

Hereinafter, reference will now be made in detail to embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the present invention rather unclear. Further, names of elements used in description below are selected in consideration of ease of preparation of the specification and may thus differ from names of parts of an actual product.

Figure 1:
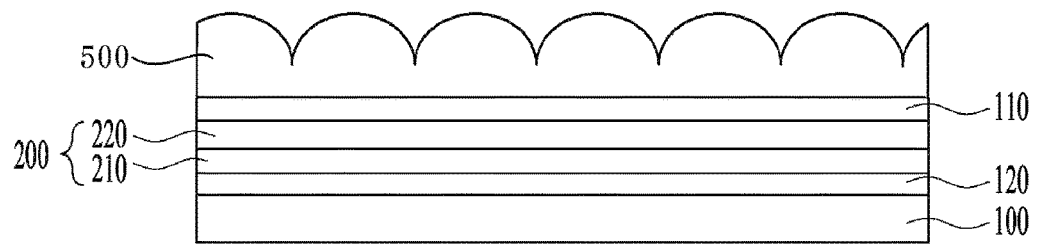
FIG. 1 is a view illustrating a stereoscopic image display device in accordance with embodiments of the present invention.

FIG. 1 is a view illustrating a stereoscopic image display device in accordance with embodiments of the present invention.

The stereoscopic image display device may include a display panel 200 having a plurality of sub-pixels provided in a matrix to display an image, and a parallax unit 500 located on the display panel 200 and separating the image into a plurality of views.

A light source unit 100 transmits light emitted from a light source disposed on the side surface or at the lower portion of the light source unit 100, in the upward direction, and includes the light source and a plurality of optical sheets. The light source unit 100 may be omitted depending on the type of display panel 200 used. For example, if the display panel 200 is a display panel using a self-luminous optical element, such as an organic light emitting display panel or an electrophoretic display panel, the light source unit 100 may be omitted and, if the display panel 200 is a light receiving element, such as a liquid crystal display panel, the light source unit 100 is provided.

The light source used in the light source unit 100 may be a fluorescent lamp array, light emitting diodes (LEDs), or a laser light source array. The light source unit 100 may include a plurality of optical sheets, such as a light guide panel, a diffuser sheet, etc., to guide surface light from the bottom to the display panel 200.

Display panels may be divided into light-transmitting image panels or light-receiving image panels, and either type of panel may be applied for the display panel 200. FIG. 1 illustrates the stereoscopic image display device including the light source unit 100 and, in this case, it will be described, as an example, that the display panel 200 is a light-receiving image panel. However, if the light source unit 100 is omitted, the stereoscopic image display device may be implemented using the display panel 200 and the parallax unit 500.

If the display panel 200 is a liquid crystal display panel, the display panel 200 includes a lower plate 210 and an upper plate 220 opposite each other, a liquid crystal layer interposed between the lower and upper plates 210 and 220, a thin film transistor (TFT) array disposed on the lower plate 210, and a color filter array disposed on the upper plate 220.

Liquid crystal cells are driven by an electric field between pixel electrodes to which a data voltage is supplied through the TFT and a common electrode to which a common voltage is supplied. A gate electrode of the TFT is connected to a gate line, a source electrode of the TFT is connected to a data line, and a drain electrode of the TFT is connected to the pixel electrode of the liquid crystal cell. The TFT is turned on by a gate pulse supplied through the gate line and supplies a data voltage from the data line to the pixel electrode of the liquid crystal cell.

A first polarizing plate 110 and a second polarizing plate 120 may be further provided on the upper and lower surfaces of the display panel 200. The first and second polarizing plates 110 and 120 have transmission axes intersecting each other, and control transmission of light in an initial state in which no voltage is applied thereto, under the condition that arrangements of liquid crystals of the upper and lower plates 210 and 220 are twisted in the initial state.

If the display panel 200 is an organic light emitting display panel, the display panel 200 may include a driving transistor array (not shown) provided on the lower plate 210 and an organic light emitting diode array (not shown) provided thereon and the driving transistor array and the organic light emitting diode array on the lower plate 210 are sealed by the upper plate 220. Here, the upper plate 220 may be omitted. Further, the lower plate 210 and the upper plate 220 are formed of a flexible polymer or glass and, thus, the display panel 200 may be implemented as a flexible display. In this case, the upper plate 220 may be omitted.

In the parallax unit 500, optical elements having a designated pitch in the vertical direction are regularly arranged. Here, the optical elements may be lenses or a parallax barrier. The illustrated example includes lenticular lenses as the optical elements.

A lenticular lens array may include lenticular lenses having designated curvature, as exemplarily shown in FIG. 1, or be a switchable lens array that is turned on/off by a voltage, thereby adjusting a refractive index. If the lenticular lens array is a switchable lens array, the stereoscopic image display device may selectively display a 3D or 2D image by turning-on/off the switchable lens array. In this case, the switchable lens array may include first and second substrates opposite each other, a liquid crystal layer interposed between the first and second substrates, a common electrode provided on the second substrate, and a plurality of first electrodes provided on the first substrate so as to correspond to lens areas, each of which corresponds to one pitch.

If the switchable lens array displays a 3D image, the highest voltage is applied to the first electrode, which is located at the center of the lens area, a gradually reduced voltage is applied to regions that are increasingly farther away from the center of the lens area, and the lowest of the voltages applied to the first electrodes is applied to a second electrode. Here, the center of the lens area has the smallest refractive index, and a region that is gradually farther away from the center of the lens area has a gradually increased refractive index. Thus, an optical refractive index difference that is the same as that of lenticular lenses is acquired, and an image from the display panel 200 is separated according to respective views.

Further, if the switchable lens array displays a 2D image, a difference in refractive indexes between the first electrodes and the common electrode is removed and thus the switchable lens array functions as a transparent film and displays the image from the lower display panel 200 as is.

Figure 2:
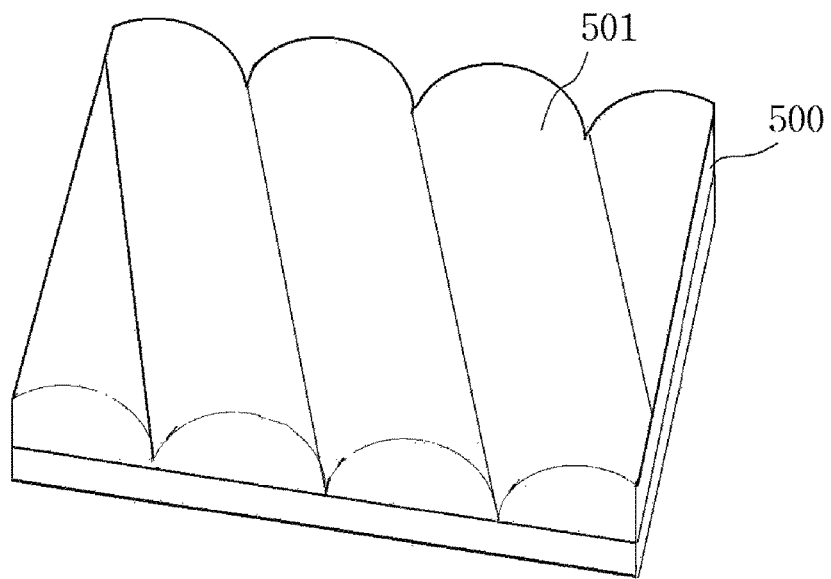
FIG. 2 is a view illustrating a parallax unit in accordance with embodiments of the present invention.

FIG. 2 is a view illustrating the parallax unit 500 in accordance with embodiments of the present invention.

The parallax unit 500 is provided in a shape in which a plurality of lenticular lenses (hereinafter referred to as 'lenses') 501 is arranged in the longitudinal direction. Although this embodiment exemplarily illustrates the lenses 501 as optical elements, the optical elements of the parallax unit 500 of embodiments of the present invention are not limited to the lenses 501, as described above, and may be electric field driven liquid crystal lenses, a barrier, or an electric field driven liquid crystal barrier.

Here, the lenses 501 have a designated tilt angle relative to the sub-pixels disposed in the y-axis direction. Here, the tilt angle may be 30° to 60°. The lenses 501 having such a tilt angle cause a plurality of view images displayed by the display panel 200 to be separated from each other and then to reach a left eye or a right eye of a viewer.

Since the lenses 501 have a tilt angle of 30° to 60°, the stereoscopic image display device of embodiments of the present invention may separate a plurality of view images from each other regardless of an image display direction (or display orientation). For this purpose, the display panel 200 may amend distribution of the view images in the sub-pixels, e.g., a view map, whenever the image display direction is changed, thereby allowing a viewer to view a stereoscopic image without 3D crosstalk.

That is, the display panel 200 of the stereoscopic image display device displays an image in one of the horizontal viewing mode, the vertical viewing mode and the diagonal viewing mode, and the stereoscopic image display device minimizes crosstalk occurring due to such change of the image display direction. Here, the image display direction of the display panel 200 in accordance with example embodiments of the present invention is not limited to the horizontal viewing mode, the vertical viewing mode and the diagonal viewing mode, and the display panel 200 may display an image in any image display direction within all viewing angle ranges of 0° to 360° without 3D crosstalk. That is, the display orientation may be changed. For example, the display may be in a landscape orientation, a portrait orientation, or other orientation.

Hereinafter, relations between the lenses 501 of the parallax unit 500 and the sub-pixels of the display panel 200 in accordance with embodiments of the present invention will be described in detail.

Figure 3:
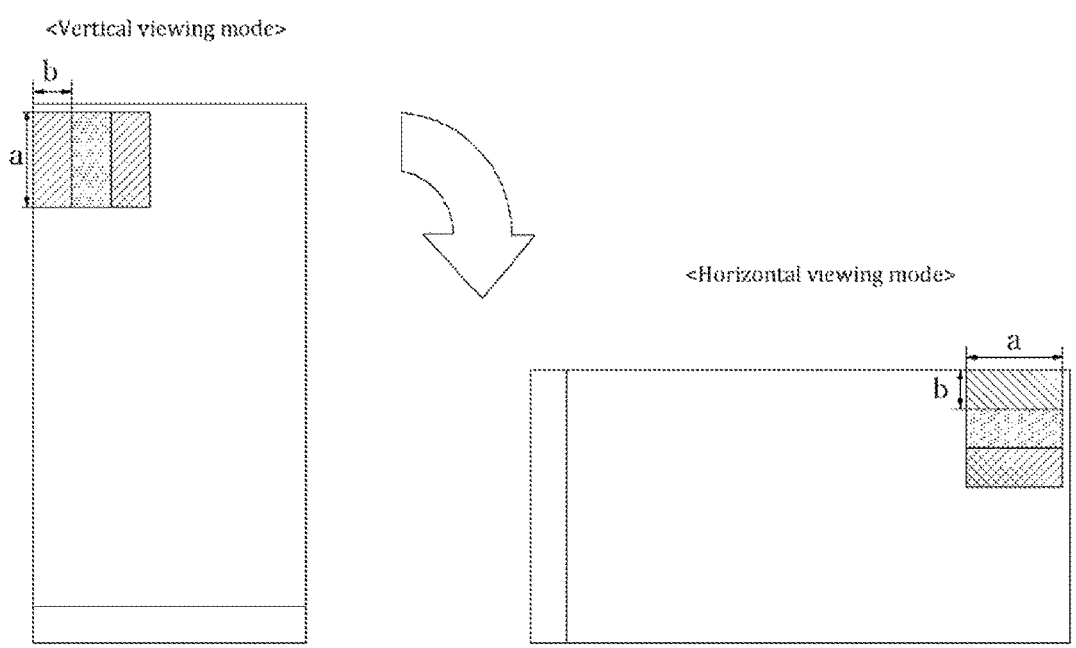
FIG. 3 is an exemplary view illustrating an arrangement of sub-pixels according to the display direction of an image displayed on a display panel of the stereoscopic image display device in accordance with embodiments of the present invention.

FIG. 3 is an exemplary view illustrating an arrangement of the sub-pixels according to the display direction of an image displayed on the display panel 200 of the stereoscopic image display device in accordance with embodiments of the present invention. As exemplarily shown in FIG. 3, the display panel 200 of the stereoscopic image display device may display an image in the horizontal viewing mode or in the horizontal viewing mode.

Here, sub-pixels, which are adjacent to each other in the horizontal direction as viewed in the vertical viewing mode, are adjacent to each other in the vertical direction as viewed in the horizontal viewing mode. Further, a horizontal pitch of the respective sub-pixels as viewed in the vertical viewing mode becomes a vertical pitch of the respective sub-pixels as viewed in the horizontal viewing mode, and a vertical pitch of the respective sub-pixels as viewed in the vertical viewing mode becomes a horizontal pitch of the respective sub-pixels as viewed in the horizontal viewing mode. The stereoscopic image display device in accordance with embodiments of the present invention determines one of the horizontal viewing mode, the vertical viewing mode, and the diagonal viewing mode as a mode in which an image is displayed, constructs an initial view map optimized for each of the viewing modes, and displays an image using an amended view map acquired by amending the view map.

In FIG. 3, the horizontal pitch of the sub-pixels viewed in the horizontal viewing mode is defined as 'a', and the horizontal pitch of the sub-pixels viewed in the vertical viewing mode is defined as 'b'.

Figure 4A:
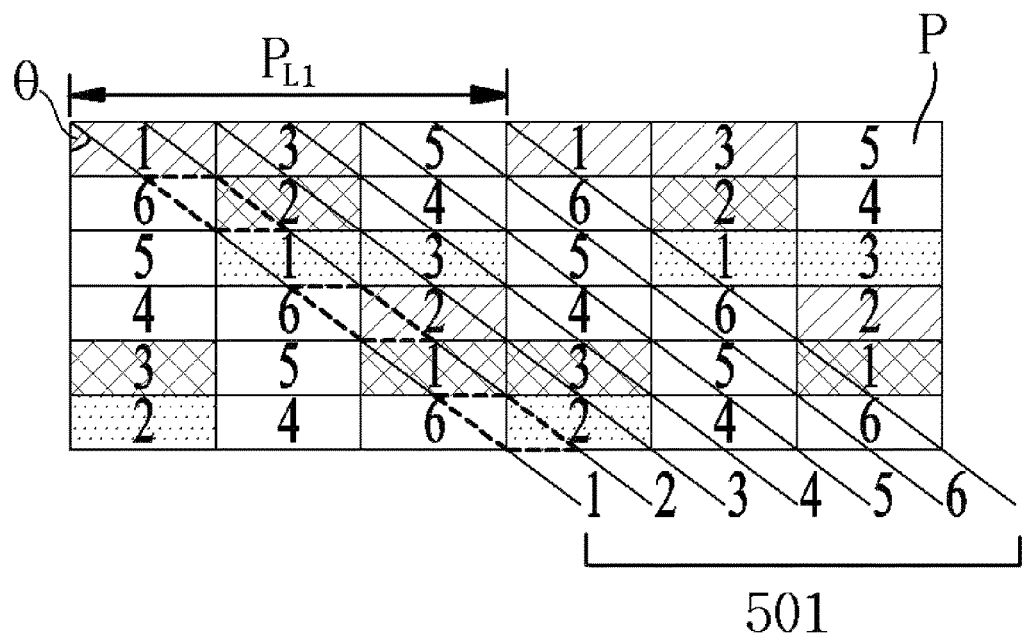
FIGS. 4A and 4B are exemplary views illustrating view maps showing a plurality of views displayed by the sub-pixels of the display panel in accordance with embodiments of the present invention, and an arrangement of lenses in a horizontal viewing mode.
Figure 4B:
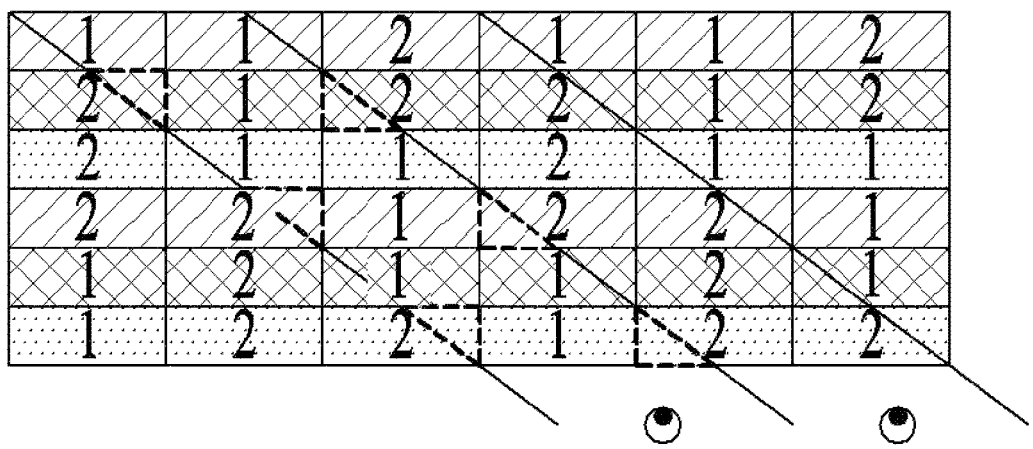

FIGS. 4A and 4B are exemplary views illustrating view maps showing a plurality of view, displayed by the sub-pixels P of the display panel 200 in accordance with embodiments of the present invention, and an arrangement of the lenses 501 in the horizontal viewing mode.

As exemplarily shown in FIG. 4A, first, to set a view map in the horizontal viewing mode of the stereoscopic image display device in accordance with embodiments of the present invention, an initial view map in which the sub-pixels P display r view images (r being a natural number of 3 or more) is constructed. FIG. 4A exemplarily illustrates an initial view map designed so that r=6, i.e., the sub-pixels P display 6 view images. However, the value of r is not limited thereto, and r may have various values from 2 to 20 or more.

Here, the initial view map may be variously changed according to design. FIG. 4A illustrates one embodiment in which three sub-pixels P arranged in the horizontal direction display a view 1, a view 3 and a view 5 and three sub-pixels P arranged on a horizontal line at the rear of the sub-pixels P displaying the view 1, the view 3 and the view 5 display a view 2, a view 4 and a view 6. Here, as the lenses 501 are shifted so as to have a designated angle, the sub-pixels P displaying the view 2, the view 4 and the view 6 are located to be shifted at the angle of the lenses 501, as compared to the sub-pixels P located on the horizontal line in front of the sub-pixels P displaying the view 2, the view 4 and the view 6 and thus displaying the view 1, the view 3 and the view 5.

Each lens 501 is divided into r virtual regions formed by dividing the pitch of the lens 501 into r equal parts. The respective sub-pixels P displaying r views correspond to the r regions, and the r regions respectively refract images displayed by the corresponding sub-pixels P so as to reach the left eye or the right eye of a user. In FIG. 4A, in which r=6, each lens 501 is divided into 6 virtual regions and sub-pixels P displaying first to sixth view images are disposed in the respective regions.

For example, with reference to FIG. 4A, among the 6 regions, sub-pixels displaying the first view image are arranged in the first region, sub-pixels displaying the second view image are arranged in the second region, sub-pixels displaying the third view image are arranged in the third region, sub-pixels displaying the fourth view image are arranged in the fourth region, sub-pixels displaying the fifth view image are arranged in the fifth region, and sub-pixels displaying the sixth view image are arranged in the sixth region. Such arrangement is not limited to sequential arrangement according to order of the view images, and may be variously modified.

In the horizontal viewing mode of the stereoscopic image display device in accordance with embodiments of the present invention, a tilt angle of the lens 501 relative to the y-axis direction is defined as 'θ' and the tilt angle θ is set to 30° to 60°, as described above. Because the tilt angle of the lens 501 is great, if the view map displaying r views is constructed, as exemplarily shown in FIG. 4A, the respective sub-pixels P are arranged to deviate from the r regions of the lens 501. For example, parts of the sub-pixels P displaying the view 2 and parts of the sub-pixels P displaying the view 6 (shown by a dotted line) are located in the first region of the lens 501. Thus, the first region of the lens 501 reflects parts of the second view image and the sixth view image together with the first view image so as to face a viewer. Therefore, if an image is displayed based on the initial view map, crosstalk, in which a viewer views overlapping images, increases.

To solve such crosstalk, in the stereoscopic image display device in accordance with embodiments of the present invention, the initial view map is amended such that the lens 501, divided into the r regions, are re-divided into k regions ('k' being a natural number of 2 or more, which is less than 'r'), and sub-pixels predominantly corresponding to one of the k regions, i.e., an $l^{th}$ region ('l' being a natural number of less than 'k'), display the same view image, and then an image is displayed on the amended view map. Here, the term "predominantly corresponding to" indicates that 50% or more of the area of the sub-pixel corresponds to any one of the k regions of the lens 501. Here, because among the sub-pixels displaying the r views, the sub-pixels located on the front horizontal lines and the sub-pixels located on the rear horizontal lines are shifted at the angle of the lens 501, the sub-pixels arranged in the $l^{th}$ region are shifted at the angle of the lens 501, as compared to the sub-pixels P located on the front horizontal line and arranged in the $l^{th}$ region, thereby displaying the same image.

FIG. 4B exemplarily illustrates the amended view map. In the amended view map, the value of k is 2 and, thus, the lens 501 is divided into two regions. Among the two regions, all the sub-pixels predominantly corresponding to the first region display a view 1, and all the sub-pixels predominantly corresponding to the second region display a view 2. Accordingly, as exemplarily shown in FIG. 4B, among the sub-pixels continuously (adjacently) arranged in the horizontal direction corresponding to the lens 501, at least two sub-pixels display the same view. With reference to FIG. 4B, three continuous sub-pixels corresponding to the lens 501 may display images in order of the view 1, the view 1 and the view 2 or images of the view 1, the view 2 and the view 2 according to horizontal lines to which the three sub-pixels belong. As a result, the initial view map, in which three sub-pixels are designed to display 6 views, is amended to a view map, in which three sub-pixels display the same view.

Figure 5A:
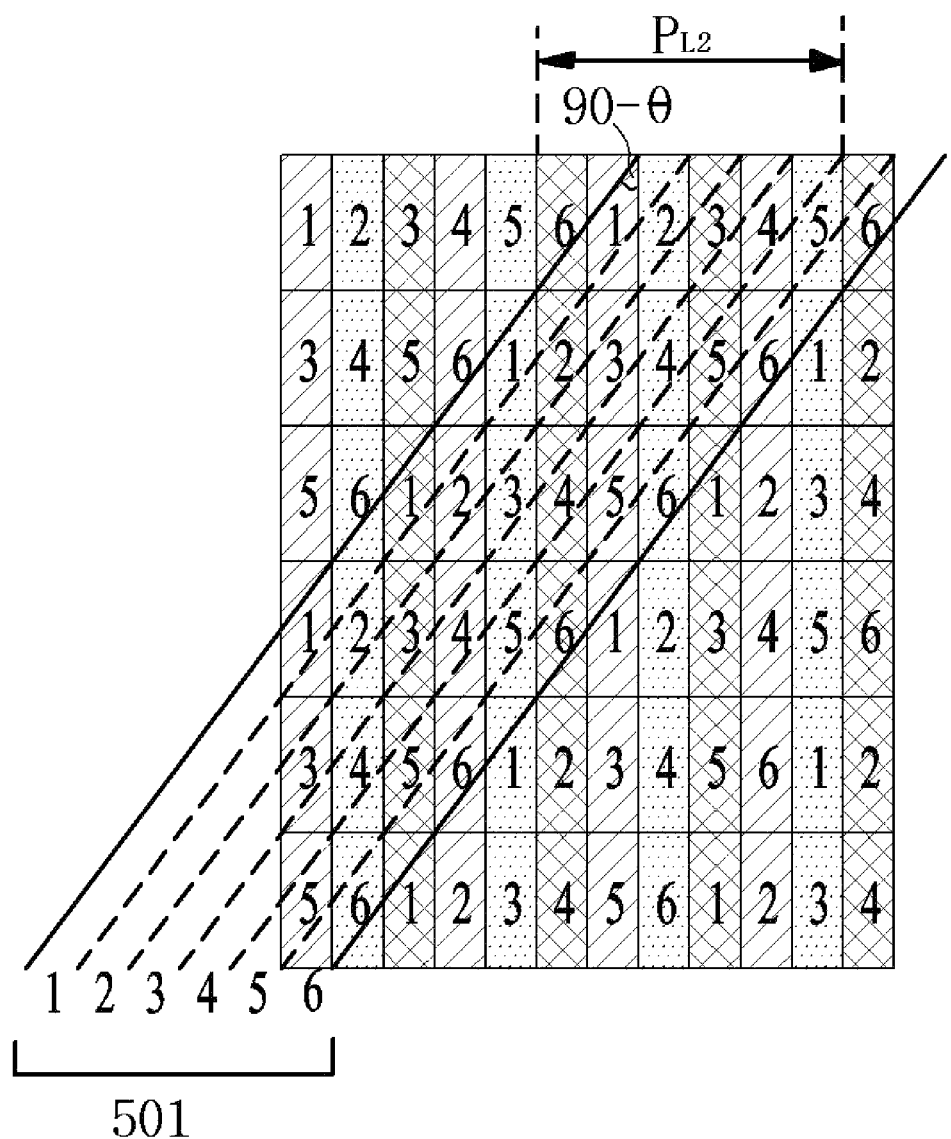
FIGS. 5A and 5B are exemplary views illustrating view maps showing a plurality of views displayed by the sub-pixels of the display panel in accordance with embodiments of the present invention, and an arrangement of the lenses in a vertical viewing mode.
Figure 5B:
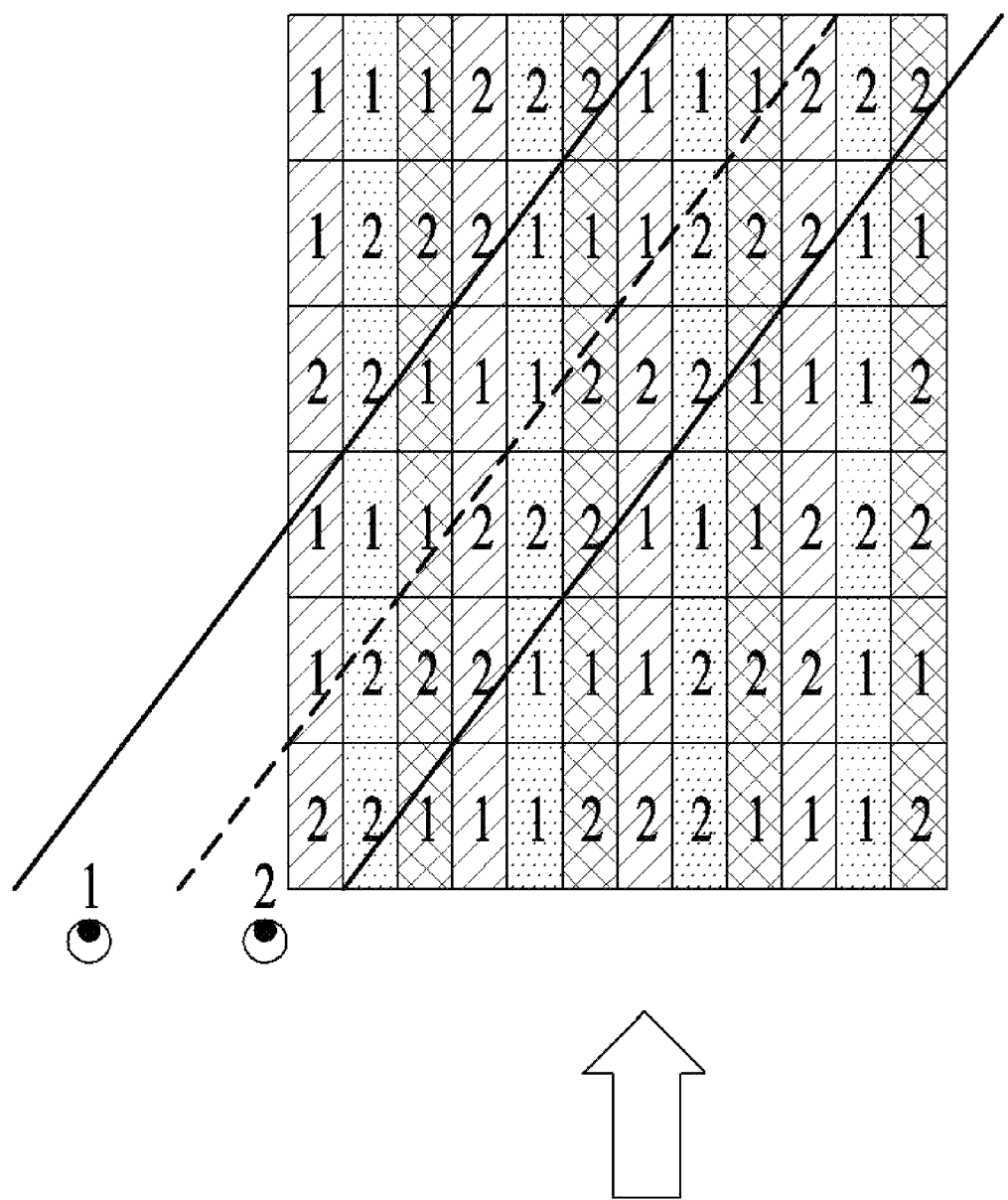

FIGS. 5A and 5B are exemplary views illustrating view maps showing a plurality of views displayed by the sub-pixels P of the display panel 200 in accordance with embodiments of the present invention, and an arrangement of the lenses 501 in the vertical viewing mode. In the vertical viewing mode, the vertical pitch of the sub-pixels as viewed in the horizontal viewing mode will be defined as a horizontal pitch, and the horizontal pitch of the sub-pixels as viewed in the vertical viewing mode will be defined as 'b'.

As exemplarily shown in FIG. 5A, to set a view map in the vertical viewing mode of the stereoscopic image display device in accordance with embodiments of the present invention, an initial view map in which the sub-pixels P display r view images (r being a natural number of 3 or more) is constructed. FIG. 5A exemplarily illustrates an initial view map designed so that r=6, i.e., the sub-pixels P display 6 view images. However, the value of r is not limited thereto, and r may have various values from 2 to 20 or more.

Here, the initial view map may be variously changed according to design. FIG. 5A illustrates one embodiment in which six sub-pixels P arranged in the horizontal direction sequentially display a view 1 to a view 6.

On the assumption that the tilt angle of the lens 501 relative to the y-axis direction in the horizontal viewing mode is θ, the display panel 200 in the vertical viewing mode is rotated from the display panel 200 in the horizontal viewing mode by an angle of 90° and, thus, the tilt angle of the lens 501 relative to the y-axis direction in the vertical viewing mode is (90−θ). Here, the value of (90−θ) is any one of 30° to 60°.

As the lenses 501 are shifted so as to have a designated angle relative to the y-axis direction, sub-pixels displaying the view 1 to the view 6 are located so as to be shifted at the tilt angle of the lenses 501, as compared to sub-pixels located on the horizontal line in front of the former.

Each lens 501 is divided into r virtual regions formed by dividing the pitch of the lens 501 into r equal parts. The respective sub-pixels P displaying r views correspond to the r regions, and the r regions respectively refract images displayed by the corresponding sub-pixels P so as to reach the left eye or the right eye of a user. In the same manner as in FIG. 4A, in FIG. 5A, in which r=6, each lens 501 is divided into 6 virtual regions and sub-pixels P displaying first to sixth view images are disposed in the respective regions.

For example, with reference to FIG. 5A, among the 6 regions, sub-pixels displaying the first view image are arranged in the first region, sub-pixels displaying the second view image are arranged in the second region, sub-pixels displaying the third view image are arranged in the third region, sub-pixels displaying the fourth view image are arranged in the fourth region, sub-pixels displaying the fifth view image are arranged in the fifth region, and sub-pixels displaying the sixth view image are arranged in the sixth region. Such arrangement is not limited to sequential arrangement according to an order of the view images, and may be variously modified.

In the same manner as in the horizontal viewing mode, in the vertical viewing mode of the stereoscopic image display device, the initial view map is amended such that the lens 501, divided into the r regions, are re-divided into k regions (k being a natural number of 2 or more, which is less than r), and sub-pixels predominantly corresponding to one of the k regions, i.e., an $l^{th}$ region (1 being a natural number of less than k), display the same view image, and then an image is displayed on the amended view map.

FIG. 5B exemplarily illustrates the amended view map. In the amended view map, the value of k is 2 and, thus, the lens 501 is divided into 2 regions. Among the 2 regions, all the sub-pixels predominantly corresponding to the first region display a view 1, and all the sub-pixels predominantly corresponding to the second region display a view 2. Accordingly, as exemplarily shown in FIG. 5B among the sub-pixels continuously arranged in the horizontal direction corresponding to the lens 501, at least two sub-pixels display the same view. With reference to FIG. 5B, among six sub-pixels corresponding to the lens 501, three sub-pixels located at the left may display the view 1, and three sub-pixels located at the right may display the view 2.

Figure 6A:
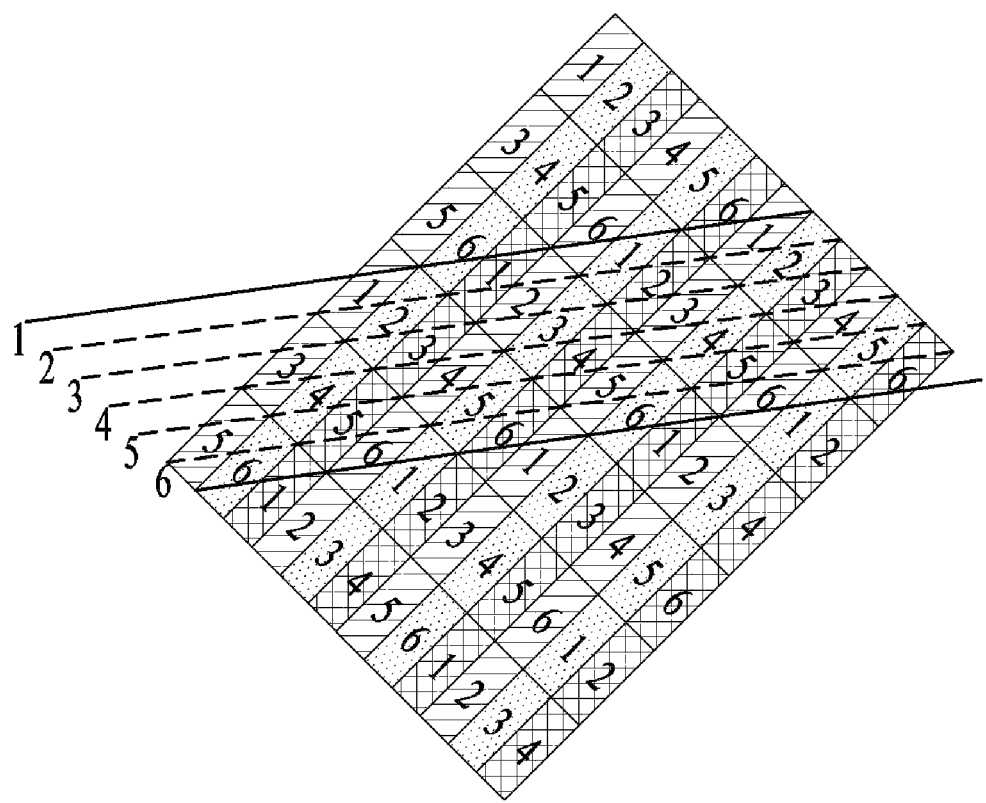
FIGS. 6A and 6B are exemplary views illustrating view maps showing a plurality of views displayed by the sub-pixels of the display panel in accordance with embodiments of the present invention, and an arrangement of lenses in a diagonal viewing mode.
Figure 6B:
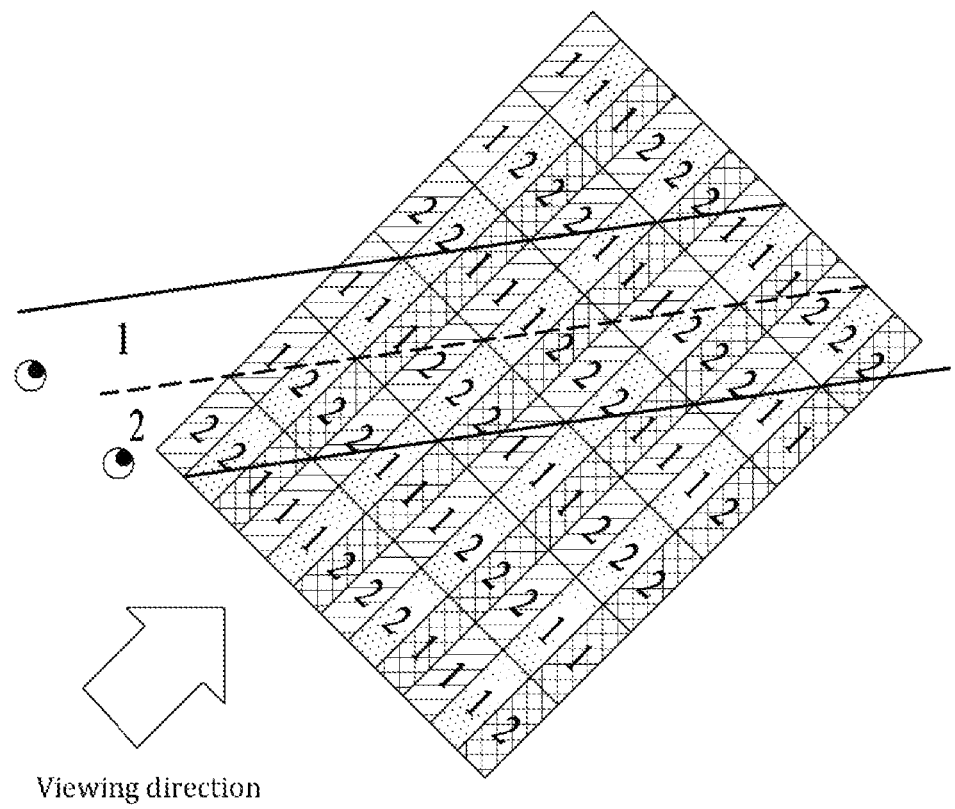

FIGS. 6A and 6B are exemplary views illustrating view maps showing a plurality of views displayed by the sub-pixels P of the display panel 200 in accordance with embodiments of the present invention, and an arrangement of lenses in a diagonal viewing mode. Here, although a mode, in which a viewer views the display panel 200 tilted at an angle of 45°, is exemplarily described as the diagonal viewing mode, the diagonal viewing mode may be applied to the display panel 200 tilted at an angle of 30° to 60°. Construction of a view map and amendment thereof in the diagonal viewing mode are the same as in the vertical viewing mode and a detailed description thereof will thus be omitted.

By comparison between FIG. 4A and FIG. 5A, the pitch of the lens 501 as viewed in the horizontal viewing mode and the pitch of the lens 501 as viewed in the vertical viewing mode are different. However, the amended view map of the horizontal viewing mode and the vertical viewing mode may be identical. With reference to 4B and 5B, if the amended view map of the horizontal viewing mode is rotated to 90°, the resultant amended view map is same of the amended view map of the vertical viewing mode. That is, the display panel 200 can be tilted at any angle of 0~360° displaying 3D image in any viewing mode among the horizontal, vertical, and diagonal mode without 3D crosstalk.

With reference to FIG. 4A, the pitch $P_{L1}$ of each lens 501 in the horizontal viewing mode is located so as to correspond to a horizontal pitch of a sub-pixel group displaying one unit view, i.e., the view 1 to the view 6. Here, the pitch $P_{L1}$ of the lens 501 is a multiple of the horizontal pitch of the sub-pixels P and may be expressed as na. Here, 'a' refers to the horizontal pitch of the sub-pixels P as viewed in the horizontal viewing mode, as described above, and 'n' refers to the number of sub-pixels P arranged in the horizontal direction of the sub-pixel group displaying the view 1 to the view 6 in the horizontal viewing mode. That is, in the view map shown in FIG. 4A, the value of n is 3.

With reference to FIG. 5A, arrangement of the sub-pixel group in the vertical viewing mode is different from arrangement of the sub-pixel group in the horizontal viewing mode. Therefore, the pitch $P_{L2}$ of the lens 501 in the vertical viewing mode is a multiple of the horizontal pitch of the sub-pixels P in the vertical viewing mode and may be expressed as mb. Here, 'b' refers to the horizontal pitch of the sub-pixels P as viewed in the vertical viewing mode, as described above, and 'm' refers to the number of sub-pixels P arranged in the horizontal direction of the sub-pixel group displaying the view 1 to the view 6 in the vertical viewing mode. That is, in the view map shown in FIG. 5A, the value of m is 6.

As described above, the tilt angle of the lenses 501 may be changed within the range of 30° to 60° according to design. Here, the tilt angle of the lenses 501 is determined within the range of 30° to 60° by Equation 1 below.

$$\tan^{-1}\left\{\frac{H \times D}{Dx(H+E)}\right\} < \theta < \tan^{-1}\left\{\frac{H \times D}{Dx(H-E)}\right\} \quad \text{[Equation 1]}$$

Here, H refers to a horizontal size of the display panel 200, D refers to an optimal viewing distance, and E is expressed as Equation 2 below.

$$E = \text{ViewInterval} \times (\text{NumberofInitialViews} - \text{NumberofOverlappingViews}) \quad \text{[Equation 2]}$$

Here, the view interval refers to a difference between numbers of views of images displayed by adjacent sub-pixels. For example, if one sub-pixel displays the view 1 and an adjacent sub-pixel displays the view 3, as exemplarily shown in FIG. 4A, the view interval is 2.

The number of initial views is the number of views displayed in the initial view map, and is equal to the value of r.

The number of overlapping views means the number of sub-pixels displaying the same view image when the r sub-pixels displaying r initial views are divided into the k regions and sub-pixels located in the $l^{th}$ region of the k regions display the same view image. For example, if r=6 and k=2, as exemplarily shown in FIGS. 4A and 4B, among the 6 sub-pixels, the number of sub-pixels predominantly corresponding to one of the two regions, i.e., the k regions, and displaying the same view image is 3 and, thus, the number of overlapping views is 3.

Figure 7A:
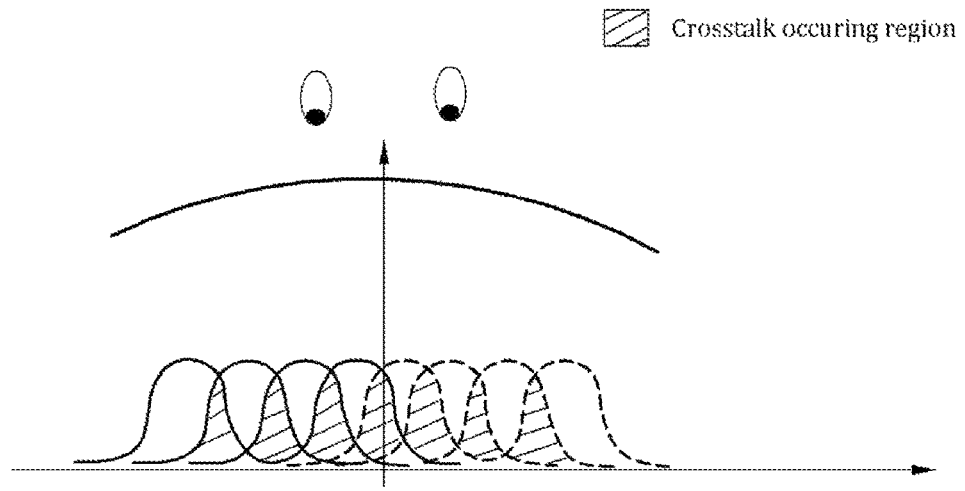
FIGS. 7A and 7B are views illustrating reduction in 3D crosstalk in the stereoscopic image display device in accordance with embodiments of the present invention.
Figure 7B:
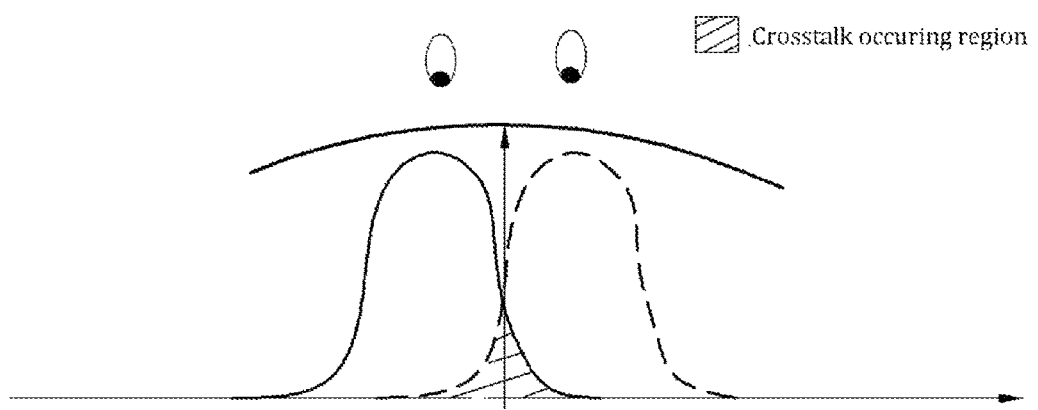

FIGS. 7A and 7B are views illustrating reduction in 3D crosstalk in the stereoscopic image display device in accordance with embodiments of the present invention.

FIG. 7A illustrates occurrence of crosstalk when the stereoscopic image display device in accordance with the related art displays a 8-view image. Here, if the tilt angle of optical elements is 10° or more, overlapping of views occurs, as exemplarily shown in FIG. 7A and, thus, several views overlapping each other are visible to both eyes of a viewer and 3D crosstalk is increased. Therefore, a related art stereoscopic image display device has a technical difficulty in greatly increasing the tilt angle of optical elements of a parallax unit attached to the stereoscopic image display device.

In accordance with embodiments of the present invention, as exemplarily shown in FIG. 7B, the tilt angle of the optical elements of the parallel unit 500 is increased to 30° to 60° and the sub-pixels in which overlapping of views occurs display the same view, thereby minimizing 3D crosstalk. Therefore, the stereoscopic image display device in accordance with embodiments of the present invention greatly increases the tilt angle of the optical elements of the parallax unit 500 and thus the direction of an image displayed by the stereoscopic image display device is changeable.

Figure 8A:
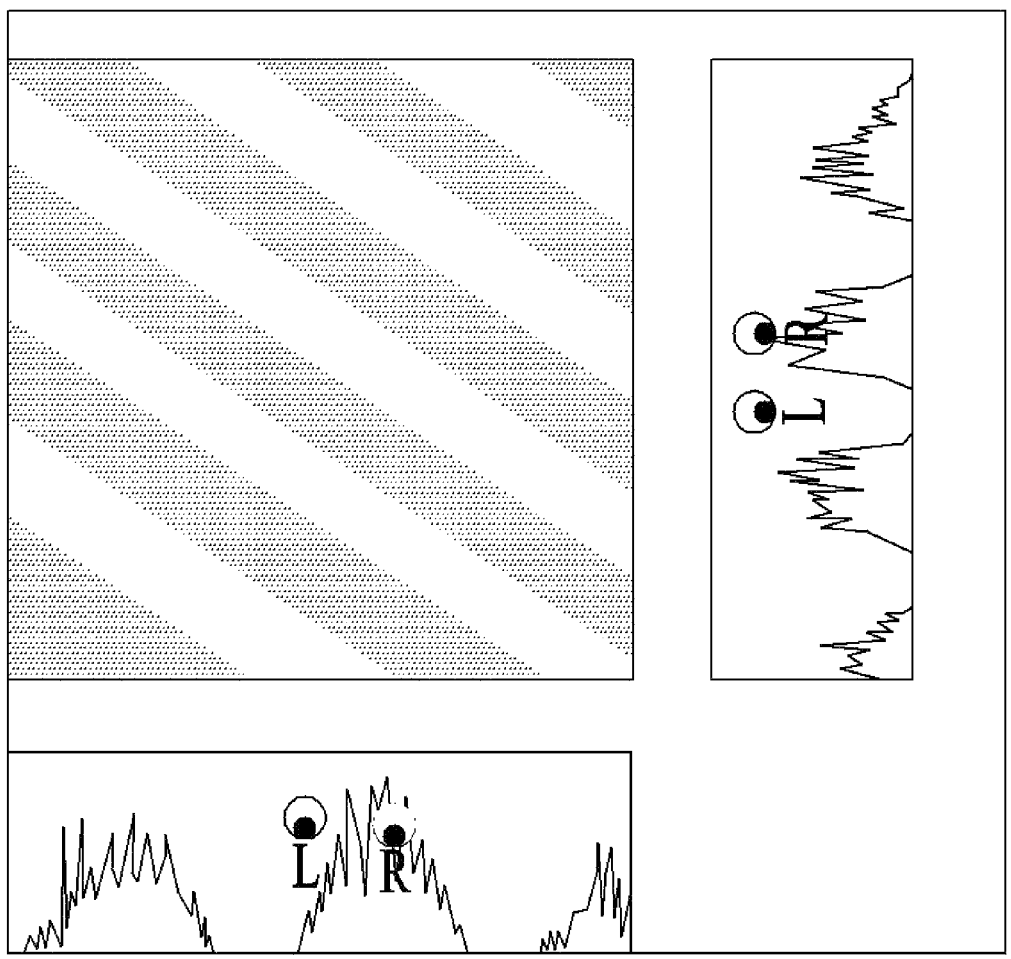
FIGS. 8A and 8B are graphs illustrating experimental data exhibiting separation between both eye images in the stereoscopic image display device in accordance with embodiments of the present invention.
Figure 8B:
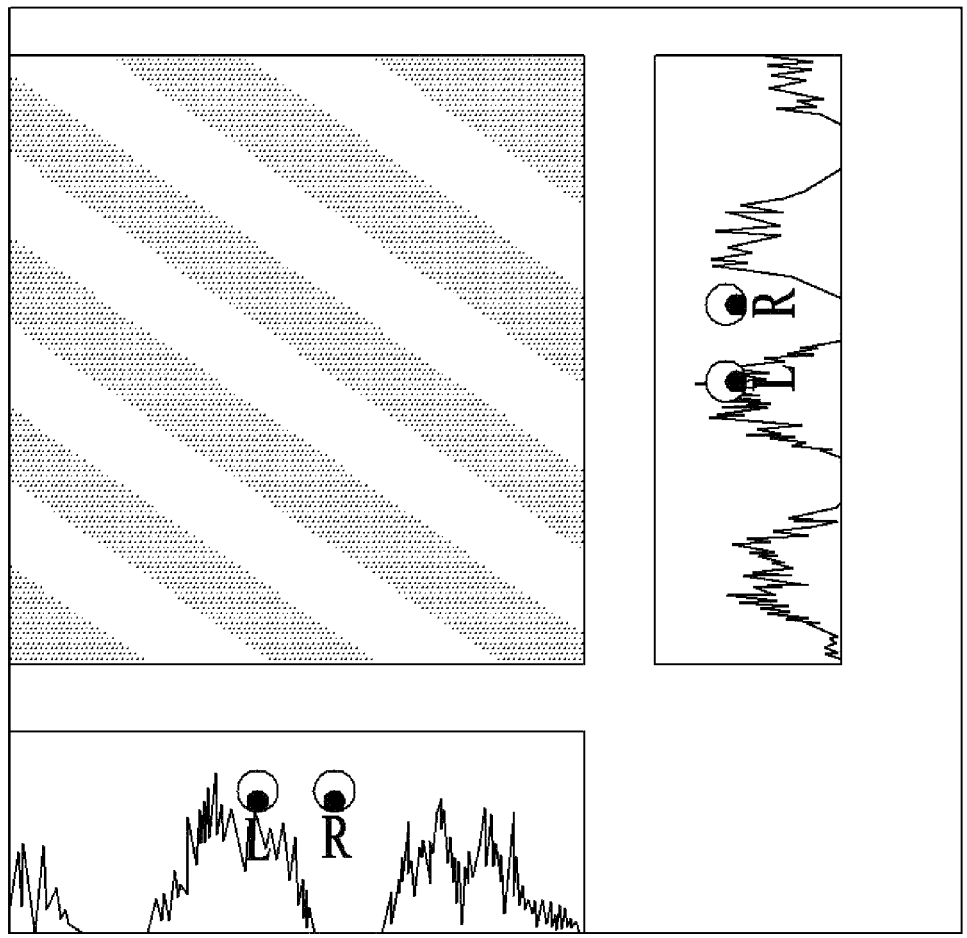

FIGS. 8A and 8B are graphs illustrating experimental data exhibiting separation between both eye images in the stereoscopic image display device in accordance with embodiments of the present invention. FIG. 8A illustrates display of a right eye image, and FIG. 8B illustrates display of a left eye image.

In the x-axis and the y-axis, L indicates the position of a left eye and R indicates the position of a right eye. Further, a graph shown on the x-axis exhibits a display intensity of an image according to viewing positions in the horizontal viewing mode, and a graph shown on the y-axis exhibits a display intensity of an image according to viewing positions in the vertical viewing mode.

With reference to FIGS. 8A and 8B, it may be confirmed that, regardless of the horizontal and vertical viewing mode, a right eye image is observed concentrically at a region shown by R and a left eye image is observed concentrically at a region shown by L. That is, in the stereoscopic image display device as described, 3D crosstalk both in the horizontal viewing mode and the vertical viewing mode is minimized and thus separation of both eye images may be executed and a stereoscopic image may be displayed.

Figure 9A:
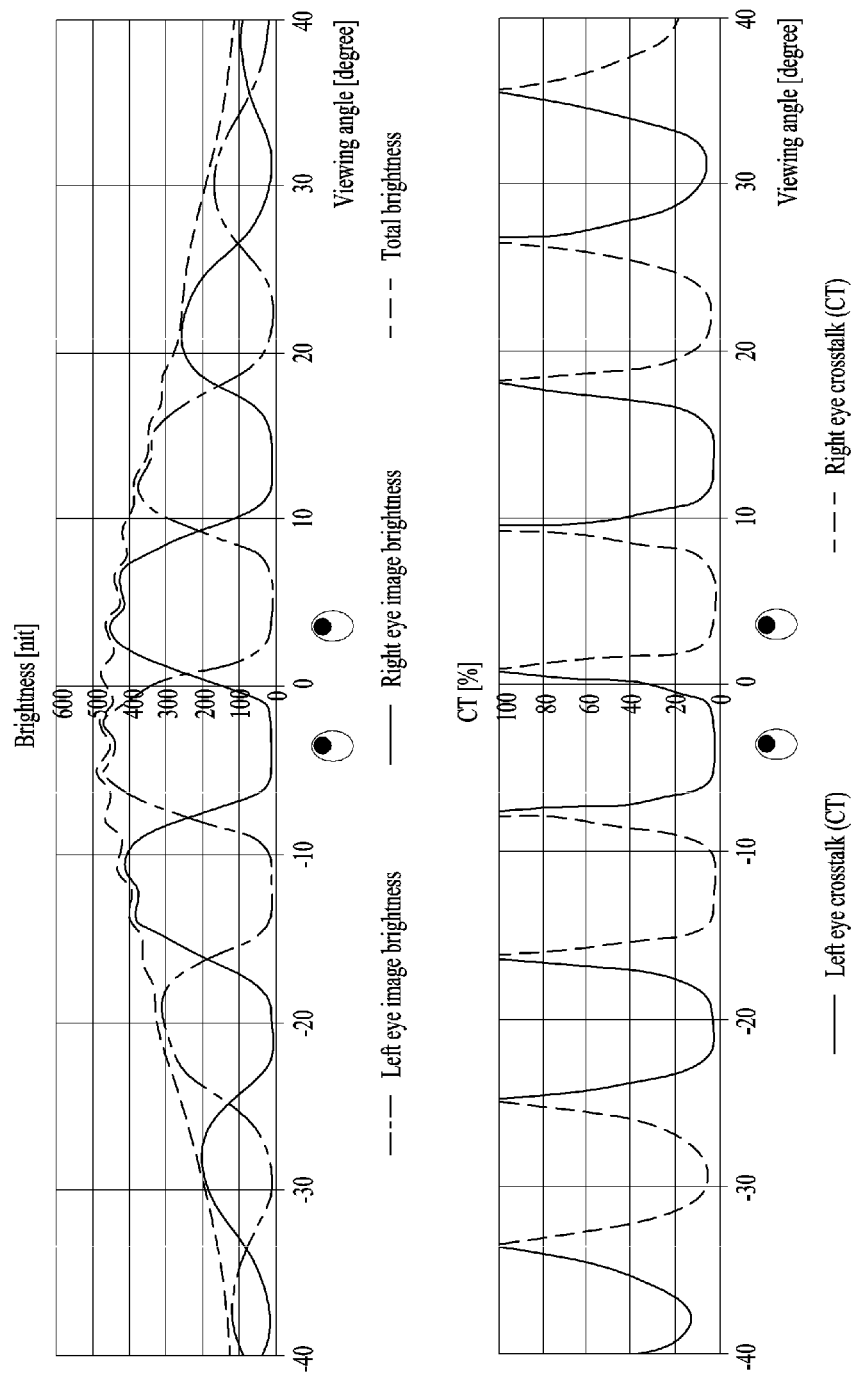
FIG. 9A illustrates graphs of experimental data indicating brightness and crosstalk according to viewing angles in the horizontal viewing mode.
Figure 9B:
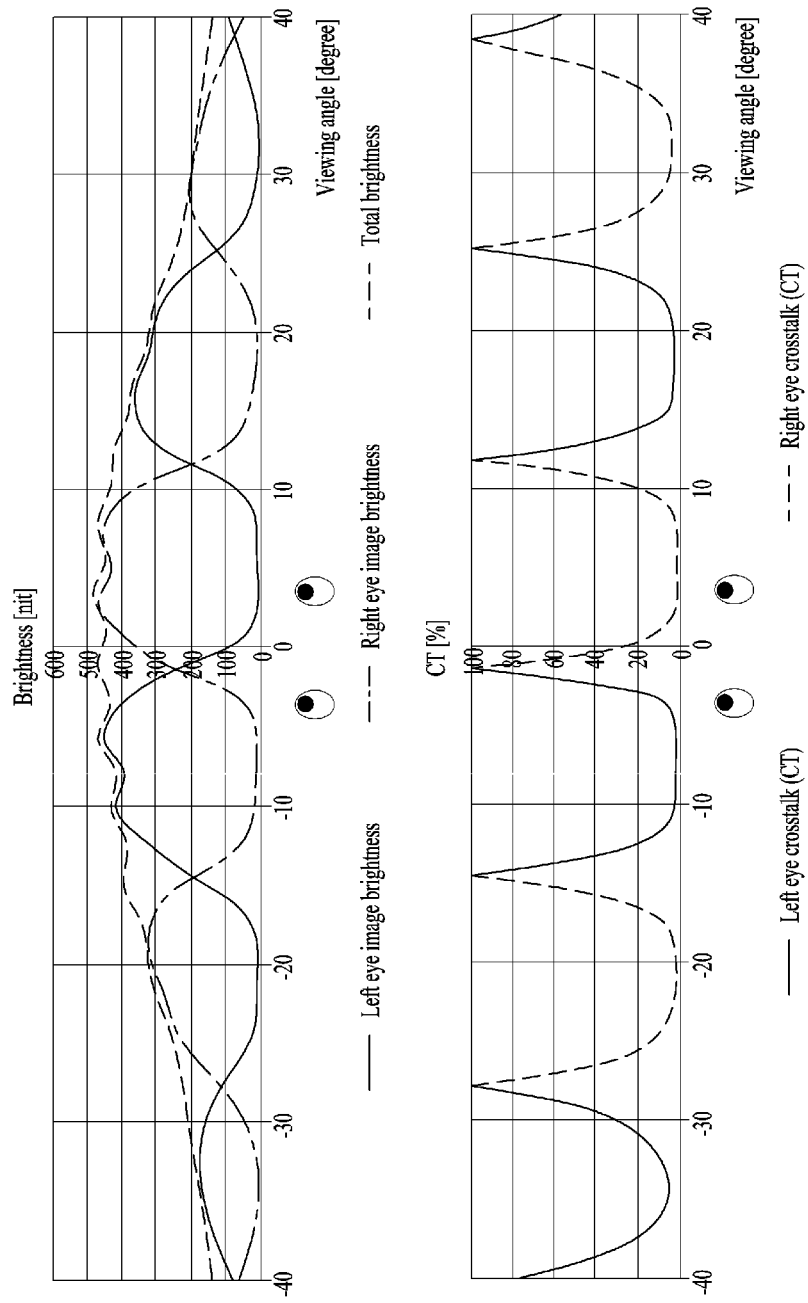
FIG. 9B illustrates graphs of experimental data indicating brightness and crosstalk according to viewing angles in the vertical viewing mode.

FIG. 9A illustrates graphs of experimental data indicating brightness and crosstalk according to viewing angles in the horizontal viewing mode. FIG. 9B illustrates graphs of experimental data indicating brightness and crosstalk according to viewing angles in the vertical viewing mode. If a viewer stares forward, the viewing angle of the viewer is −10° to 10° and an area around 0° is located at the middle between both eyes of the viewer.

With reference to FIGS. 9A and 9B, it may be understood that, both in the horizontal viewing mode and the vertical viewing mode, the highest brightness is observed at a region in which a viewer views an image and little crosstalk occurs in such a region.

Further, to prevent pseudo-stereoscopic vision and 3D crosstalk occurring if the viewer gazes in a different direction, eye-tracking technology may be applied to the stereoscopic image display device in accordance with the present invention and, in this case, display quality of the stereoscopic image display device is further increased. To employ such eye-tracking technology, the stereoscopic image display device may further include a camera and, in this case, read a viewing position of a viewer through the camera, reconstruct a view map based on the viewing position of the viewer and thus display an image.

As can be understood from the above description, a stereoscopic image display device in accordance with embodiments of the present invention may be driven in a horizontal viewing mode, a vertical viewing mode, and a diagonal viewing mode in an arrangement that minimizes 3D from crosstalk from occurring due to overlapping of a plurality of view images.

It will be apparent to those skilled in the art that various modifications and variations can be made in the stereoscopic image display device and the driving method thereof of the present invention without departing from the spirit or scope of the invention. Thus, it is intended that the present invention cover the modifications and variations of this invention provided they come within the scope of the appended claims and their equivalents.

What is claimed is:

1. A stereoscopic image display device, comprising:
   a display panel including a plurality of sub-pixels arranged in a matrix defined by a horizontal direction and a vertical direction, the display panel having a changeable display direction; and
   a parallax unit on the display panel and including a plurality of optical elements having a tilt angle of 30° to 60° relative to the vertical direction and a pitch corresponding to a multiple of a pitch of the sub-pixels,
   wherein, among the sub-pixels located to correspond to each of the optical elements, at least two sub-pixels, adjacently arranged, display the same view image,
   wherein the display panel displays an image in one of a horizontal viewing mode, a vertical viewing mode, and a diagonal viewing mode, and
   wherein, in one of the horizontal viewing mode, the vertical viewing mode, and the diagonal viewing mode, an initial view map constructed to cause the sub-pixels of the display panel to separate an input image into r view images (r being a natural number of 3 or more) is amended, and the image is displayed using the amended view map to display k view images (k being a natural number of 2 or more, being less than r) so that the at least two sub-pixels, adjacently arranged, display the same view image.

2. The stereoscopic image display device according to claim 1, wherein:
   the optical elements include one of lenticular lenses and electric field driven liquid crystal lenses;
   each lens is provided with k regions formed by dividing the pitch thereof into k equal parts; and
   the amended view map is constructed so that sub-pixels corresponding to an $l^{th}$ region of the k regions (with 'l' being a natural number of 'k' or less) display the same view, by amending the initial view map.

3. The stereoscopic image display device according to claim 2, wherein the sub-pixels corresponding to the $l^{th}$ region are shifted at the tilt angle, as compared to sub-pixels located on a horizontal line in front of the sub-pixels corresponding to the $l^{th}$ region and arranged in the $l^{th}$ region.

4. The stereoscopic image display device according to claim 2, wherein, with the pitch of the sub-pixels as viewed in the horizontal viewing mode being 'a' and the pitch of the sub-pixels as viewed in the vertical viewing mode being 'b':
   the pitch of the lenses as viewed in the horizontal viewing mode is n×a (with n being a natural number of 2 or more); and
   the pitch of the lenses as viewed in the vertical viewing mode is m×b (with m being a natural number of 2 or more).

5. The stereoscopic image display device according to claim 2, wherein the tilt angle of the lenses in the horizontal viewing mode or the vertical viewing mode is determined within the range of 30° to 60° by $$\tan^{-1}\left\{\frac{H \times D}{Dx(H+E)}\right\} < \theta < \tan^{-1}\left\{\frac{H \times D}{Dx(H-E)}\right\},$$

wherein H refers to a horizontal size of the display panel in the horizontal viewing mode or the vertical viewing mode, D refers to an optimal viewing distance, and E is determined by $$E = \text{ViewInterval} \times (\text{NumberofInitialViews} - \text{NumberofOverlappingViews}),$$

wherein the view interval refers to a difference between numbers of views of images displayed by adjacent sub-pixels, the number of initial views is the number of views displayed in the initial view map firstly constructed to set the k regions, being equal to the value of r (with r being a natural number of 3 or more, being greater than k), and the number of overlapping views means the number of sub-pixels displaying the same view image, when sub-pixels located in the $l^{th}$ region of the k regions display the same view image.

6. The stereoscopic image display device according to claim 1, wherein the optical elements include any one of lenticular lenses, a barrier, an electric field driven liquid crystal barrier, and electric field driven liquid crystal lenses.

7. The stereoscopic image display device according to claim 1, wherein the display panel includes any one of a liquid crystal display panel, an organic light emitting display panel, and a flexible display panel.

8. A driving method of a stereoscopic image display device, having
   a display panel including a plurality of sub-pixels arranged in a matrix defined by a horizontal direction and a vertical direction to display images with the display panel having a changeable display direction, and a parallax unit on the display panel and including a plurality of optical elements having a tilt angle of 30° to 60° relative to the vertical direction and a pitch corresponding to a multiple of the pitch of the sub-pixels, the driving method comprising:
   constructing an initial view map to cause the display panel to display r view images (r being a natural number of 3 or more);
   amending the initial view map to cause sub-pixels displaying the r view images to display k view images (k being a natural number of 2 or more, being less than r) by defining k regions formed by dividing the pitch of each optical element into k equal parts, causing sub-pixels corresponding to an $l^{th}$ region of the k regions (with 'l' being a natural number of 'k' or less) to display the same view image and causing sub-pixels corresponding to the different regions to display different view images; and
   displaying a plurality of views separated from the display image.

9. The driving method according to claim 8, wherein the display panel displays an image in one of a horizontal viewing mode, a vertical viewing mode, and a diagonal viewing mode.

10. The driving method according to claim 9, wherein construction of the initial view map includes:
   determining one of the horizontal viewing mode, the vertical viewing mode, and the diagonal viewing mode as an image display mode of the display panel; and
   constructing the initial view map optimized for each of the viewing modes.

11. The driving method according to claim 10, wherein, in amendment of the initial view map:
   in the horizontal viewing mode, the initial view map is amended so that sub-pixels adjacent to each other in the horizontal direction as viewed in the horizontal viewing mode display the same view; and
   in the vertical viewing mode and the diagonal viewing mode, the initial view map is amended so that sub-pixels adjacent to each other in the horizontal direction as viewed in the vertical viewing mode display the same view.

12. The driving method according to claim 10, wherein, in amendment of the initial view map, the sub-pixels corresponding to the $l^{th}$ region are shifted at the tilt angle, as compared to sub-pixels located on a horizontal line in front of the former and arranged in the $l^{th}$ region.

* * * * *